March 23, 1948.　　　E. C. STRONG ET AL　　　2,438,352
CONTROL APPARATUS
Filed Nov. 17, 1943　　　2 Sheets-Sheet 2
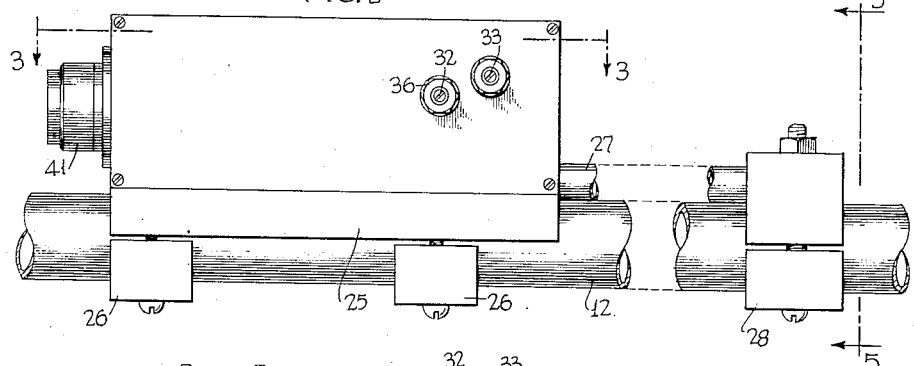
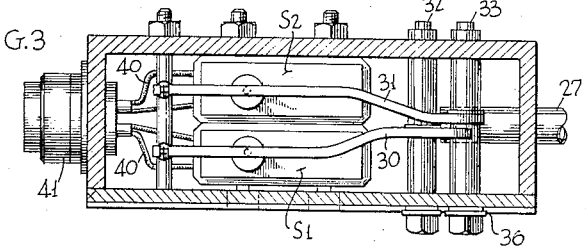
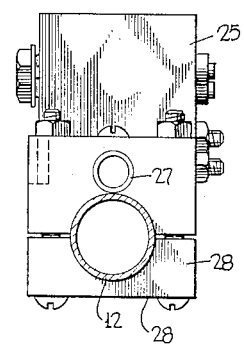
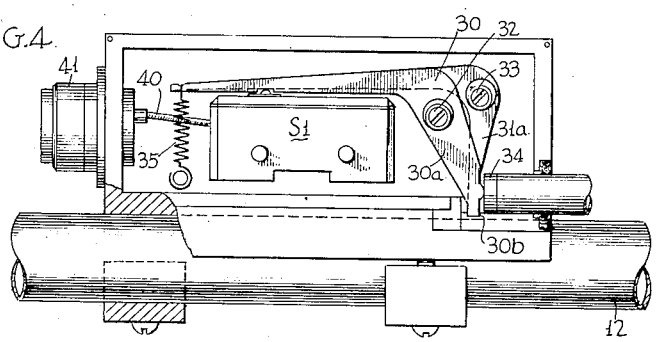
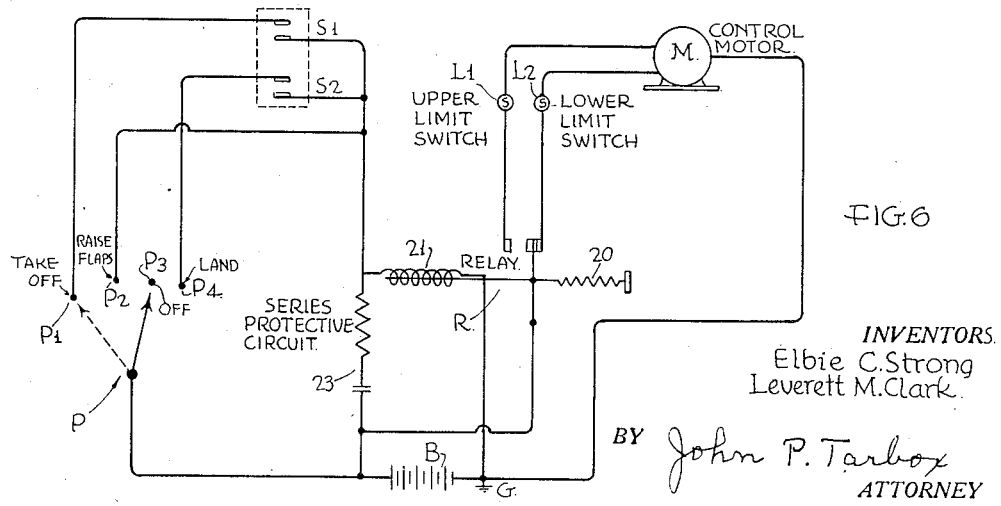
INVENTORS.
Elbie C. Strong
Leverett M. Clark
BY John P. Tarbox
ATTORNEY Patented Mar. 23, 1948

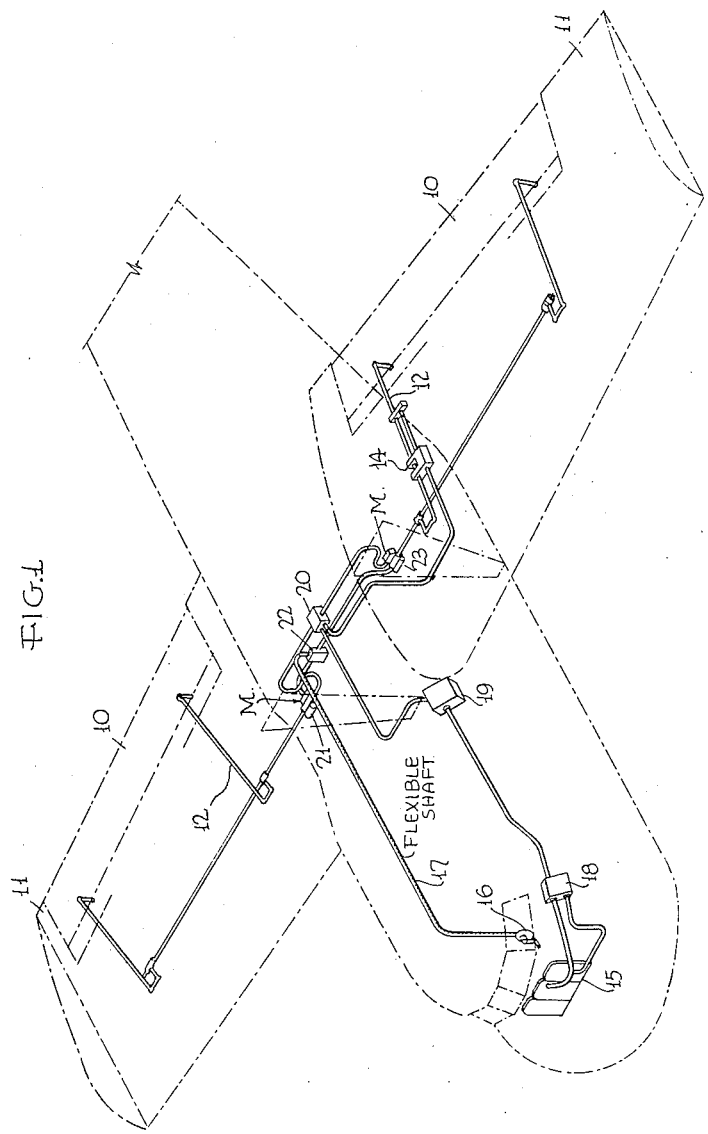

2,438,352

UNITED STATES PATENT OFFICE 2,438,352

CONTROL APPARATUS

Elbie C. Strong, Long Island City, and Leverett M. Clark, Tuckahoe, N. Y., assignors, by mesne assignments, to Waugh Equipment Company, New York, N. Y., a corporation of Maine Application November 17, 1943, Serial No. 510,590

5 Claims. (Cl. 318—545)

1

This invention relates to apparatus for controlling loads, strains and movements in machine and structural members and has for an object the provision of improvements in this art.

Parts and members of machines and structures are designed to carry loads and to withstand strains, movements, and forces. Such members are at times subjected to loads or strains in excess of those which they were designed to withstand. Overloads are undesirable and many times cause failure of members. It is often necessary to provide means of preventing overloading of members of machines or structures. It is common practice to provide means to indicate the magnitude of power input to or loads applied to a machine or structure as a whole. Common means may be meters such as wattmeters, pressure gages and overload devices in the power supply line itself. Meters serve only to indicate the magnitudes of loads that have been applied but not to limit the load to a desirable or safe value. Devices in the power supply lines serve as protectors to the prime mover itself rather than to the machine or structure. In many cases the machine or structure as a whole may not be overloaded, but one or more individual members may be. The type of protection which is needed is one that will control or limit the loads, strains or movements in or on the individual member.

One of the objects of this invention is to provide a means of controlling or limiting the loads on a member of a machine or structure by utilizing the strain in the member itself due to the loads imposed upon it. A device which accomplishes this purpose will be described hereafter. Such a device may be used on one or more members of a machine or structure or may be used on the machine or structure as a whole. Another object of this invention is to provide means for controlling or limiting movements and displacements in equipment as distinguished from loads or strains. This object may be accomplished by utilizing the strain in the member subject to movement and by employing auxiliary devices such as relays, switches and motors.

One application of the invention is to the control of aircraft wing flaps in take-off and landing. In airplane operation, particularly on airfields with runways of limited length, it is important to increase the lift during take-off or landing when lower speeds prevail. The pilot may set the flaps manually to accomplish this but it is desirable to relieve him of constant attention to their operation and to avoid excessive strains upon the flap operating mechanism. The

2 present invention provides apparatus which can be set into action by the pilot and which will thereafter operate automatically to hold the flaps in the extreme position for a predetermined maximum strain on their operating mechanism. It may be desirable to provide one condition for take-off and another for landing, it being usual with some aircraft, for example, to take off at seventy miles per hour and to land at one hundred miles per hour. Accordingly the invention provides means for selectively operating at a plurality of strain limits. The invention may, of course, have many other applications for selective control where differential movements are encountered.

One of the particular objects of the invention is to provide an improved device for registering distortion in a stressed member and to automatically reduce the stress to safe limits.

Another object is to provide a plurality of selective limit controls for different conditions.

Another object is to provide simple and effective mechanical switch operating means responsive to movements of a stressed member.

The above-mentioned and other objects will be apparent from the following description of an exemplary embodiment of the invention, reference being made to the accompanying drawings, wherein:

Fig. 1 is a schematic plan view of the invention applied to the control of airplane wing flaps;

Fig. 2 is a vertical elevation of the switch operating device applied to a load carrying member such as the push-pull flap operating tube or rod of an airplane;

Fig. 3 is a horizontal section taken on the line 3—3 of Fig. 2;

Fig. 4 is an inside elevation;

Fig. 5 is a transverse section on the line 5—5 of Fig. 2; and

Fig. 6 is a wiring diagram of the installation shown in Fig. 1.

As applied to the airplane of Fig. 1, the flaps 10 of the wings 11 are operated through push-pull rods 12 from motors M, up by push and down by pull. The flaps are, of course, raised by air pressure when the airplane is in flight. One of the push-pull rods 12 is provided with a device 14 according to the present invention which through means to be described controls in part the operation of the motors M, the entire mechanism being under the supervision of the pilot through a selective switch on the control panel 15. The pilot may also selectively operate the flaps independently of the motors and strain sensitive means as by a crank 16 and flexible shafting 17 suitably connected to the push-pull rods. Certain junction boxes 18, 19, 20 and gear boxes 21, 22, 23 are shown in Fig. 1 but need no further attention.

Fig. 6 illustrates the control circuit. The motor M when set into operation, if not otherwise halted, will be stopped in limiting positions of the flap by an upper limit switch L1 or a lower limit switch L2. The motor is powered from any suitable current supply, as for example a battery B, a master cut out switch (not shown) being employed to take the flaps from under the control of the motor when desired. The flaps may still be adjusted or operated by the hand crank 16.

When the motor is in circuit it is controlled by a relay R which is constantly urged to flap lowering contact position by a spring 20 and moved in the opposite or flap raising position when desired by a solenoid 21. The relay coil, battery and motor are grounded at G.

Means are provided for operating the relay at one or more predetermined strain points of the push-pull rod 12 or independently of any stress in the rod. This means comprises a pilot's control switch P having contacts P1, P2, P3 and P4, respectively, for take-off, raise flaps, off, and land. The contacts P1 and P4 are connected to the relay R through limit switches S1 and S2, respectively, and the contact P2 is connected to the relay directly. A series protective circuit 23, including a resistance and a condenser, is placed in series with the relay coil in parallel with the circuit through the limit switches to damp possible chatter and arcing of the switch contacts.

The switches S1, S2 are secured as companion control elements on the push-pull rod 12. They may be of different characteristics but as shown may be of identical characteristics with different settings. They are preferably plunger toggle throw switches of the "Microswitch" type which operate at a given point with very slight force and displacement.

The switches S1 and S2 are mounted in a sealed box 25 which is rigidly secured to the push-pull rod 12 by clamps 26. An operating rod 27 enters the box 25 through a felt-sealed opening at one end and is attached at its outer end to the push-pull rod 12 by a clamp 28. The operating rod may be made of any suitable material, preferably the same as the push-pull rod, and its length is determined by the sensitivity desired.

The rod 27 operates the switches S1, S2 through bell-crank levers 30, 31 pivoted on eccentric adjusted shafts 32, 33, one arm 30a or 31a of each crank being provided with a rounded projection 30b or 31b which engages a wear plate 34 secured on the end of the rod 27 and the other arm being pulled downward by a spring 35. The springs close the switches. The eccentric shafts 32, 33 are adjusted from the outside of the casing and are held in adjusted positions by locknuts 36. The eccentric shafts 32 and 33 are adjusted in such a manner that there is required a greater movement of bell-crank lever 31 to operate switch S—2 for landing than is required for bell-crank 30 to operate switch S—1 for take-off. In this manner of operation there is provided flap elevation at lower take-off speeds than for landing speeds. Comparative strain may, for example, correspond respectively to 2500 pounds take-off and 5000 pounds landing. The switches are provided with leads 40 passing out of the box through a sealed bushing or socket fitting 41. A preferred setting is to have the projections of the bell-crank arms in the same plane of the end of the plate 34 and at the mid-height of the rod 27 when there is no strain in the push-pull rod 12 and the eccentrics are in the same adjusted positions. Then one or both of the eccentrics is adjusted until its switch operates at the desired load point. It will be noted that the bell-cranks are brought close together at their pivot shafts to bring the rod-engaging arms close together and in symmetrical relation to the vertical axial plane of the rod 27.

In operation, when the switch P is at the "off" position P3 the relay is biased by the spring 20 in the direction to maintain the flaps in their lowermost position. When the switch P is at the "raised flaps" position P2, the relay coil 21 is continuously energized and the flaps are maintained in their raised position, controlled by the upper limit switch L1. This is the normal flight condition.

When the switch P is at the "take-off" position P1, the switch S1 is in circuit, and when the push-pull rod 12 is elongated by a predetermined amount, say when the pull in the rod is 2500 p. s. i., the plate 34 of the control rod 27 moves back sufficiently to permit the spring to move the bell-crank lever 30 and operate the switch S1. Through relay R this operates the motor M to raise the flaps and relieve the tension in the push-pull rod 27. This opens switch S1, allows spring 20 to operate the relay in the reverse direction and operate the motor to lower the flaps again. This balancing adjustment continues as long as the predetermined strain is present, though it may mean many different settings of the flaps and when the strain is continuously under the predetermined amount the motor operates until the lower limit switch is operated with the flaps in their fully lowered position. If the strain continues to rise above the predetermined point, on the other hand, the flaps will be carried to their fully raised position.

When the switch P is moved to the "land" position, the switch S2 is placed in circuit with the relay and the same operation is realized as with switch S1 but at a different predetermined strain value.

There may be one, two or any desired number of switches mounted together to serve various purposes and to operate at various loadings. Some applications may be the following:

Overload prevention: In aircraft cables, cables of cranes, hoists, tow lines and structural members of cranes, hoists, and power presses.

Minimum and/or maximum loads or stresses: During pressing operations such as installation of tires, gears, wheels.

Minimum and/or maximum loads or stresses: In members of machines, buildings, and structures of all kinds including concrete, steel, or other materials.

Warning signals: On bridge members or cables, building members and other structures and tow lines.

Limiting of movements or displacements: In electric and power lines, cables and wiring in aircraft, and many types of sagging or taut wires and cables.

Instead of or in addition to controlling loads the apparatus may measure and indicate loads or strains by the introduction of suitable indicators.

It will be evident that the invention has many applications other than that described. Also that it may have other embodiments within the limits of the prior art and the scope of the subjoined claims.

What is claimed is:

1. Apparatus for measuring and controlling loads, movements and the like, comprising in combination, a push-pull rod, a switch box mounted on said push-pull rod, a control rod secured to said push-pull rod at a spaced point from said switch box and having its free end extending into said box, and a plurality of switches in said switch box moved concurrently by said control rod but having effective operation at different positions of said control rod, means for changing the load on said push-pull rod, and means for selectively operating said load changing means through one of said switches.

2. Apparatus for measuring and controlling loads, movements and the like, comprising in combination, a push-pull rod, a switch box and control rod secured at spaced points along said push-pull rod, a plurality of plunger toggle switches mounted in said switch box with their plungers at right angles to said rods, bell-crank levers mounted in said switch box on adjustable pivot shafts, means for actuating said bell-crank levers together by said control rod by change in length of said push-pull rod, springs for moving the levers in the other direction to operate said switches, the switches being arranged to operate at different load limits, and means for adjusting the operating position of said levers.

3. Apparatus for measuring and controlling loads, movements and the like, comprising in combination, a load-carrying member, a plurality of switches mounted thereon at a first point, a control rod mounted on said member at a second point, and means cooperating with the free end of said rod and with said switches for operating said switches at different amounts of movement of said rod.

4. Apparatus as set forth in claim 3, in which said means includes bell-crank levers each connected to a switch and all operatively associated with the end of said rod, and means for adjusting the fulcrums of said cranks individually.

5. Apparatus for controlling loads comprising load means, plural switches, a rod connection between said load means and switches susceptible to load strain variation, control connections between said said switches and rod connection whereby said switches are actuated only on predetermined conditions of load strain, and adjustment means for altering the time of actuation of each operated switch.

ELBIE C. STRONG.
LEVERETT M. CLARK.

REFERENCES CITED

The following references are of record in the file of this patent:

UNITED STATES PATENTS

| Number | Name | Date |
|---|---|---|
| 1,440,610 | Kupetz | Jan. 2, 1923 |
| 2,237,170 | Williamson | Apr. 1, 1941 |
| 2,362,343 | Bath | Nov. 7, 1944 |